(12) United States Patent
Chen et al.

(10) Patent No.: US 8,872,780 B2
(45) Date of Patent: Oct. 28, 2014

(54) METHOD AND ELECTRONIC DEVICE FOR GESTURE RECOGNITION

(75) Inventors: Yu Chen, Beijing (CN); Shifeng Peng, Beijing (CN); Xiaowen Ma, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 133 days.

(21) Appl. No.: 13/498,758

(22) PCT Filed: Sep. 21, 2010

(86) PCT No.: PCT/CN2010/077207
§ 371 (c)(1),
(2), (4) Date: Mar. 28, 2012

(87) PCT Pub. No.: WO2011/037655
PCT Pub. Date: Apr. 7, 2011

(65) Prior Publication Data
US 2012/0188191 A1    Jul. 26, 2012

(30) Foreign Application Priority Data
Sep. 29, 2009   (CN) .......................... 2009 1 0235571

(51) Int. Cl.
G06F 3/041    (2006.01)
G06F 3/0488   (2013.01)
(52) U.S. Cl.
CPC ................................. *G06F 3/04883* (2013.01)
USPC ....................................................... 345/173
(58) Field of Classification Search
None
See application file for complete search history.

(56) References Cited

U.S. PATENT DOCUMENTS 6,570,557 B1 *   5/2003   Westerman et al. .......... 345/173
7,643,012 B2     1/2010   Kim et al.
(Continued)

FOREIGN PATENT DOCUMENTS

CN          101046717        10/2007
CN          101356491         1/2009
WO       WO 2008/094791       8/2008

OTHER PUBLICATIONS

International Preliminary Report on Patentability for PCT Patent Application Serial No. PCT/CN2010/077207, dated Apr. 3, 2012, 6 pages.

(Continued)

*Primary Examiner* — Joseph Feild
*Assistant Examiner* — Parul Gupta
(74) *Attorney, Agent, or Firm* — Brinks Gilson & Lione; G. Peter Nichols

(57) ABSTRACT

A method and an electronic device for gesture recognition are provided. The method is applied to an electronic device, which displays at least one object on a touch screen. Wherein the object has two states, one of which is a selected state and the other is an unselected state. The method includes: detecting a first touch point and a second touch point on the touch screen; when the first touch point and the second touch point are on the touch screen simultaneously, and the first touch point corresponds to at least one object, and the second touch point corresponds to at least another object, entering a multi mode. Wherein the at least one object corresponding to the first touch point and the at least one object corresponding to the second touch point are set to the selected state. It can simplify user operations by using this method.

10 Claims, 7 Drawing Sheets

---

Detect a first touch point and a second touch point on the touch screen — 101

Enter multi-select mode when the first touch point and the second touch point are simultaneously on the touch screen, with the first touch point corresponding to at least one object and the second touch point corresponding to at least one object — 102

(56) References Cited

U.S. PATENT DOCUMENTS

| | | | |
|---|---|---|---|
| 7,663,607 B2* | 2/2010 | Hotelling et al. | 345/173 |
| 8,248,384 B2* | 8/2012 | Zhang et al. | 345/173 |
| 8,587,559 B2* | 11/2013 | Gandhi et al. | 345/175 |
| 2006/0097991 A1* | 5/2006 | Hotelling et al. | 345/173 |
| 2007/0115264 A1 | 5/2007 | Yu et al. | |
| 2007/0229471 A1 | 10/2007 | Kim et al. | |
| 2012/0268423 A1* | 10/2012 | Hotelling et al. | 345/174 |
| 2013/0106780 A1* | 5/2013 | Hotelling et al. | 345/174 |

OTHER PUBLICATIONS

PCT/CN2010/077207 International Search Report dated Dec. 17, 2010 (2 pages).

* cited by examiner

METHOD AND ELECTRONIC DEVICE FOR GESTURE RECOGNITION

BACKGROUND

The present invention relates to the field of electronic device technology, and particularly relates to a method and electronic device for gesture recognition.

Touch screen is a simple and convenient means for man-machine interaction. A user can operate a host only by simply touching icons or text displayed on a touch screen with his finger. With the development of multimedia information technology, touch screen technology has more potential developing space.

When the user needs to select a plurality of objects on the touch screen, if at least one object, among the objects that the user wants to select, is not adjacent to other objects, then the selection of these objects not adjacent to other objects has to be conducted with the cooperation of the Ctrl key on the keyboard of the electronic device. This method is similar to performing multi-select by clicking a target with the mouse in cooperation with the Ctrl key.

It is found in the research process that, in the above method, the system has to receive the information on the Ctrl key being triggered every time a non-adjacent object is selected, thereby increasing the complexity of the user operation.

SUMMARY

In this connection, an embodiment of the present invention provides a method of gesture recognition and electronic device, which may simplify the user operation.

A method of gesture recognition applying to an electronic device, displaying at least one object on a touch screen, wherein, the object has two states: a selected state and an unselected state, the method comprises:

detecting a first touch point and a second touch point on the touch screen;

entering multi-select mode when the first touch point and the second touch point are simultaneously on the touch screen, with the first touch point corresponding to at least one object and the second touch point corresponding to at least one object;

Wherein, the at least one object corresponding to the first touch point and the at least one object corresponding to the second touch point is set to the selected state.

Preferably, the at least one object corresponding to the first touch point and the second touch point are set to the selected state as follows:

adding the at least one object corresponding to the first touch point and the second touch point to a multi-select list, and the multi-select list is configured for storing objects in the selected state.

Preferably, the first touch point corresponding to at least one object and the second touch point corresponding to at least one object comprises:

the first touch point and the second touch point correspond to a first object;

or, the first touch point corresponds to a first object and the second touch point corresponds to a second object;

or, the first touch point corresponds to a first object, a second object is located inside a first region formed by a closed track with the second touch point as the end-point thereof;

or, the first object is located inside a second region, and the second region is formed by a closed track with the first touch point as a end-point thereof, the second object is located inside a first region, the first region formed by a closed track with the second touch point as the end-point thereof.

Optionally, if the first touch point and the second touch point correspond to a first object, the method further comprises:

exiting multi-select mode when only one touch point is detected on the touch screen, or when two touch points not corresponding to any object are detected;

if the first touch point corresponds to a first object and the second touch point corresponds to a second object, or if the first touch point corresponds to a first object and a second object is located inside a first region, or if a first object is located inside a second region and a second object is located inside a first region, the method further comprises:

exiting multi-select mode when a third touch point not corresponding to any object is detected on the touch screen.

Optionally, after entering multi-select mode, the method further comprises:

after a third object is detected to be selected, setting the state of the third object to the selected state if the third object was in the unselected state before it was selected.

Preferably, setting the state of the third object to the selected state after the third object is detected to be selected comprises:

detecting a fourth touch point and a fifth touch point simultaneously on the touch screen;

detecting a fourth track formed by the motion of the fourth touch point on the touch screen, and detecting a fifth track formed by the motion of the fifth touch point on the touch screen;

setting the state of the third object to the selected state when the third object is located inside a region formed by the fourth track and the fifth track.

Optionally, the method further comprises:

acquiring the initial position of the third object;

acquiring the target position of the third object according to the fourth track and the fifth track;

moving the third object from the initial position to the target position.

An electronic device displaying at least one object on a touch screen thereof, wherein, the object has two states: a selected state and an unselected state, the electronic device comprises:

a first detection unit, configured for detecting a first touch point and a second touch point on the touch screen;

a start unit, configured for entering multi-select mode when the first touch point and the second touch point are simultaneously on the touch screen, with the first touch point corresponding to at least one object and the second touch point corresponding to at least one object;

wherein, the at least one object corresponding to the first touch point and the second touch point are set to the selected state.

Optionally, the electronic device further comprises:

a storage unit, configured for storing a multi-select list for storing objects in the selected state;

a processing unit, configured for adding the checked objects to the multi-select list.

Optionally, the electronic device further comprises:

a second detection unit, configured for detecting a fourth touch point and a fifth touch point simultaneously on the touch screen;

a third detection unit, configured for detecting a fourth track formed by the motion of the fourth touch point on the touch screen, and detecting a fifth track formed by the motion of the fifth touch point on the touch screen;

a setting unit, configured for setting the state of the third object to the selected state when the third object is located inside a region formed by the fourth track and the fifth track.

Optionally, the electronic device further comprises:

a first acquisition unit, configured for acquiring the initial position of the third object;

a second acquisition unit, configured for acquiring the target position of the third object according to the fourth track and the fifth track;

a displacement unit, configured for moving the third object from a initial position to the target position.

It can be seen that, in the embodiments of the present invention, multi-select mode may be entered when a first touch point and a second touch point simultaneously on the touch screen are detected, with the first touch point corresponding to at least one object and the second touch point corresponding to at least one object, and the at least one object corresponding to the first touch point and the at least one object corresponding to the second touch point may be selected. In multi-select mode, even if the objects on the screen selected by the user are not adjacent, there is no need of cooperation with other keys for performing the operation, thereby simplifying the user operation, while the implementation is simple. Also, since multi-select mode is started by the object-selecting step itself, a step of entering multi-select mode by the user is omitted, thereby simplifying the user operation.

BRIEF DESCRIPTION OF THE DRAWINGS

FIG. 3(*b*) is a schematic diagram showing the user selecting three folders according to an embodiment of the present invention;

FIG. 3(*c*) is a schematic diagram showing the user selecting five folders according to an embodiment of the present invention;

FIG. 3(*d*) is a schematic diagram showing the user finishing the selection of the folders according to an embodiment of the present invention;

DETAILED DESCRIPTION

The above features and advantages of the embodiments of the present invention will be more apparent though the following detailed description with reference to specific implementations.

The embodiments of the present invention apply to an electronic device having a touch screen, with at least one object displayed on the touch screen. The displayed object has at least two states: a selected state and an unselected state.

Embodiment 1

Figure 1:
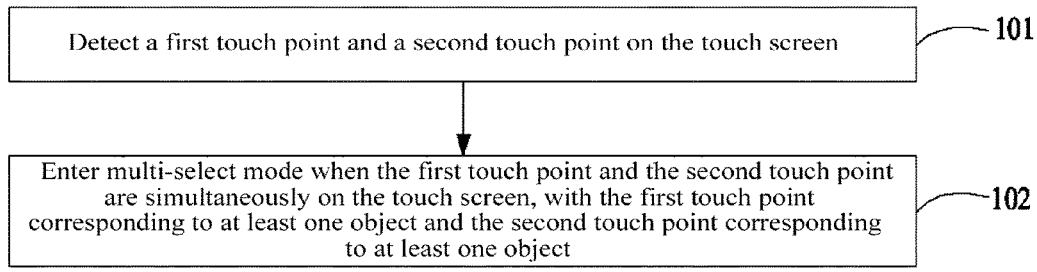
FIG. 1 is a flow chart of a method of gesture recognition according to Embodiment One of the present invention.

Referring to FIG. 1, which is a flow chart of a method of gesture recognition according to Embodiment One of the present invention, the method may comprise the following steps:

Step 101: Detecting a first touch point and a second touch point on the touch screen;

Step 102: Entering multi-select mode when the first touch point and the second touch point are simultaneously on the touch screen, with the first touch point corresponding to at least one object and the second touch point corresponding to at least one object;

The at least one object corresponding to the first touch point and the at least one object corresponding to the second touch point may be same, or may be not same, which will be illustrated respectively by way of example later. In addition, an user may trigger the two touch points simultaneously; or the user may trigger one touch point corresponding to an object first, and keep the finger from leaving the touch screen, then trigger one touch point corresponding to an object with another finger while.

Wherein, the at least one object corresponding to the first touch point and the at least one object corresponding to the second touch point are set to the selected state. It is to be noted that, before touching, the selected object may be in the unselected state, or may be in the selected state.

It can be seen that, in the embodiments of the present invention, multi-select mode may be entered when a first touch point and a second touch point simultaneously on the touch screen are detected, with the first touch point corresponding to at least one object and the second touch point corresponding to at least one object, and the at least one object corresponding to the first touch point and the at least one object corresponding to the second touch point may be selected. In multi-select mode, even if the objects on the screen selected by the user are not adjacent, there is no need of cooperation with other keys for performing the operation, thereby simplifying the user operation, and simplifying the implementation. Also, since multi-select mode is started by the object-selecting step itself, a step of entering multi-select mode by the user is omitted, thereby simplifying the user's operation.

Hereinafter, the present invention will be described in detail with reference to the respective specific embodiments.

Embodiment 2

In Embodiment 2, the user may click a same object on the touch screen with two fingers, e.g., the index finger and the middle finger of the right hand. When an object on the touch screen is selected by two touch points simultaneously, multi-select mode is started, and the object which has just been selected by the user is set to the selected state. Although two adjacent fingers of a same hand may fit the user usage practice best, two arbitrary fingers may also be possible. Whether the two arbitrary fingers, not limited that belong to a same hand or a same user or not.

In multi-select mode, the user may continue to select other objects on the touch screen by clicking with two fingers simultaneously, each of the selected objects will be set to the selected state if it was in the unselected state before the selection. In multi-select mode, the user may also continue to move the two fingers simultaneously on the touch screen to form a closed touch track. Similarly, objects corresponding to a region defined by the closed touch track will be set to the selected state if they were in the unselected state before the selection. In an implementation, objects corresponding to a region defined by the closed touch track may comprise objects located entirely inside said region, but the present invention is not limited thereto, in another implementation, objects corresponding to a region defined by the closed touch track may also comprise objects partially intersecting with the boundary of said region.

Wherein, the touch tracks formed by moving touch points with two fingers may both be closed or approximately closed, but the objects corresponding to the two regions are identical, e.g., with two adjacent fingers moving simultaneously on the touch screen, while maintaining the pose of the two fingers during the moving process. The touch tracks formed by moving touch points with two fingers may also be a part of a closed or approximately closed track, e.g., with one finger forming an approximately semicircular track, and the other finger forming another approximately semicircular track, together they composing a closed or approximately closed track.

If the user wants to exit multi-select mode, he may click at any position on the touch screen with a finger or a stylus, multi-select mode may be exited no matter the click position comprises an object or not; or, he may click a region other than the objects with two fingers, in which case the electronic device may also exit multi-select mode.

Other operations by the user based on multi-select mode, will be omitted as being similar to the existing multi-select mode. For example, if the clicked object was already in the selected state, then another click would set it to the unselected state, etc.

Figure 2:
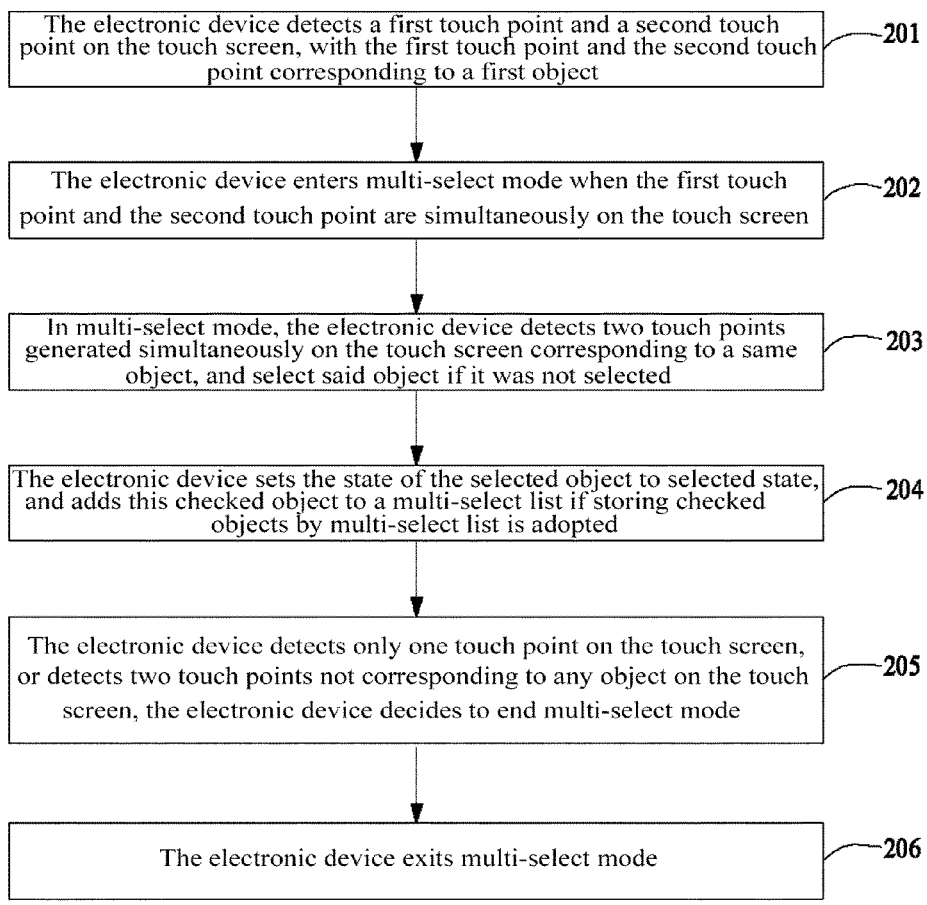
FIG. 2 is a flow chart of a method of gesture recognition according to Embodiment Two of the present invention.

Refer to FIG. 2, which is a flow chart of a method of gesture recognition according to Embodiment Two of the present invention, the method may comprise the following steps:

Step 201: The electronic device detecting a first touch point and a second touch point on the touch screen, with the first touch point and the second touch point corresponding to a first object;

Step 202: The electronic device enters multi-select mode when the first touch point and the second touch point are simultaneously on the touch screen.

It is to be noted that, the first object is set to the selected state, which may be accomplished by: adding the first object to a multi-select list, and the multi-select list is configured for storing objects in the selected state.

Step 203: In multi-select mode, the electronic device detecting two touch points generated simultaneously on the touch screen corresponding to a same object, and selecting said object if it was not selected;

Step 204: The electronic device sets the state of the selected object to the selected state, and adds this checked object to a multi-select list if storing checked objects by multi-select list is adopted.

The electronic device detecting an object being selected and setting the state of said object to the selected state may comprises the following steps:

1. The electronic device detecting a fourth touch point and a fifth touch point simultaneously on the touch screen;
2. The electronic device detecting on the touch screen a fourth track formed by the motion of the fourth touch point and a fifth track formed by the motion of the fifth touch point;
3. Setting the state of an object to the selected state when said object was in the selected state and located inside a region formed by the fourth track and the fifth track.

For the user, after entering multi-select mode, the user may select an object on the touch screen as follows: considering the thumb finger and index finger by way of example, touching the touch screen with the thumb and index finger, passing by the objected intended to be selected from both sides uninterruptedly. That is, the electronic device detects a fourth track formed by the motion of the fourth touch point, and detects a fifth track formed by the motion of the fifth touch point, determines whether the region formed by the fourth track and the fifth track contains any object. Since the position of the object is recorded by coordinate, it is only required to determine whether the coordinate corresponding to the object is within the fourth track and the fifth track.

In particular, for each of the objected intended to be selected, the tracks formed by the motion of the thumb and index finger on both sides of the object may comprise a U shape: that is, detecting the fourth touch point and the fifth touch point being the start-points of two touch tracks which are not identical or near, passing by the objected intended to be selected from both sides, moving to a same target point, and forming two touch tracks with end-points near or intersected; or detecting the fourth touch point and the fifth touch point being the start-points of two touch tracks which are identical or near, passing by the objected intended to be selected from both sides, moving not to a same target point, forming two touch tracks with end-points not near or intersected;

For each of the objected intended to be selected, the tracks formed by the motion of the thumb and index finger on both sides of the object may also comprise a ○ shape: that is, detecting the fourth touch point and the fifth touch point being the start-points of two touch tracks identical or near, passing by the objected intended to be selected from both sides, moving to a same target point, forming two touch tracks with end-points near or intersected;

For each of the objected intended to be selected, the tracks formed by the motion of the thumb and index finger on both sides of the object may also comprise a sector shape: that is, detecting the fourth touch point and the fifth touch point being the start-points of two touch tracks not identical or near, the fifth touch point forming an arc-type track while rotating around the fourth touch point as the center;

For each of the objected intended to be selected, the tracks formed by the motion of the thumb and index finger on both sides of the object may also comprise a "∥" shape: that is, detecting the fourth touch point and the fifth touch point being the start-points of two touch tracks not identical or near, passing by the objected intended to be selected from both sides, forming two touch tracks with end-points not near or intersected;

It can be determined that the coordinate of an object is within the fourth track and the fifth track when the object is located in the U shape region, in the ○ shape region, in the sector shape region, or between the two non-intersecting tracks of "∥" shape.

Optionally, the electronic device may display the process of selecting objects by the user though a Graphic User Interface (GUI). The electronic device may acquire the initial position of the object, acquire the target position of the object according to the fourth track and the fifth track, move the object from the initial position to the target position, and display for the user the entire process of selecting and moving the object.

In particular, when the coordinate of an object is determined to be inside the region of the fourth track and the fifth track, the matching display of the selected object and the touch track is triggered:

Acquiring the initial position of the object;

Acquiring the end-point coordinate of the fourth track and the end-point coordinate of the fifth track;

Calculating the coordinate of the midpoint of the end-point of the fourth track and the end-point of the fifth track according to their coordinates;

Setting the coordinate of the midpoint as the target position of the selected object;

Displaying the object at the target position.

Preferably, if the number of the selected objects is greater than one, then an object spacing value may be set, so that all of the selected objects may be distributed around the target position according to the predetermined object spacing value, preventing problem of user viewing caused by overlapped display.

Preferably, the triggering of the selected object and the matching display of the touch track may be dynamically performed in the moving process of the touch points, i.e., acquisition of the coordinate of the end-points of the fourth track and the fifth track may be performed at predetermined time intervals, the actions after the acquisition will be omitted as being similar to the above description.

Figure 3A:
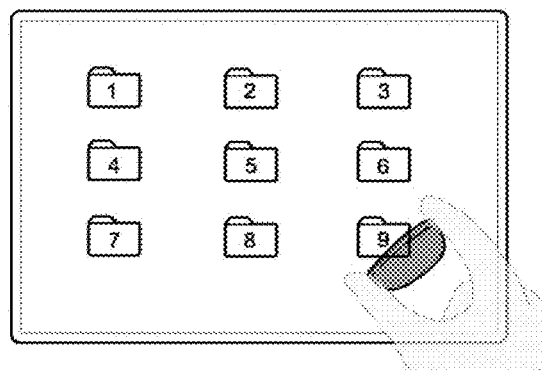
FIG. 3(*a*) is a schematic diagram showing the initial positions of the thumb and index finger when the user is selecting one folder according to an embodiment of the present invention.

Refer to FIG. 3(a), FIG. 3(a) is a schematic diagram showing the initial positions of the thumb and index finger when the user is selecting one folder according to an embodiment of the present invention. In FIG. 3(a), the touch points formed by the user's thumb and index finger start from the region intended to be commenced, move on both sides of the folder "9", the initial motion track is a U shape, since the folder "9" is contained in the U shape region, and the folder "9" was previously in the unselected state, the folder "9" is therefore selected. When the user's thumb and index finger touch the touch screen and begin to select folders, a "sack" may be displayed on the touch screen, the size of the opening of the "sack" may change along with the distance between the thumb and index finger, and the checked folders may be loaded into the "sack" and move along with it.

Figure 3B:
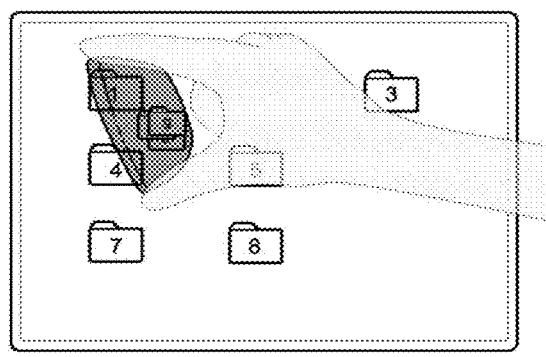

Refer to FIG. 3(b), which is a schematic diagram showing the user selecting three folders according to an embodiment of the present invention. In FIG. 3(b), the user's thumb and index finger maintain on the touch screen after selecting the folder "9", continue to select the folder "6" and the folder "2", and the folder "9", the folder "6", and the folder "2" may move along with the "sack".

Figure 3C:
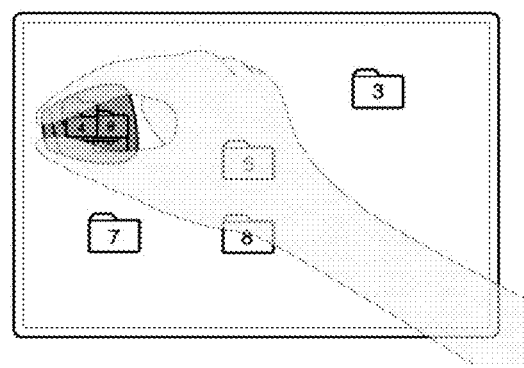
Figure 3:
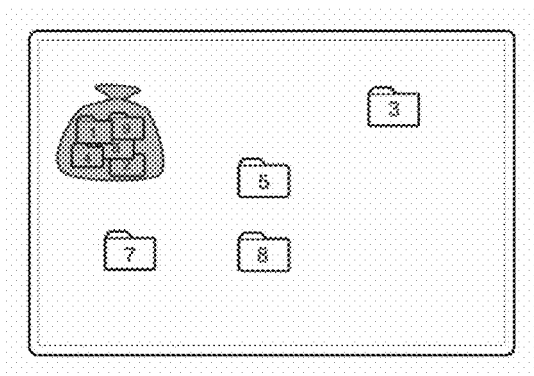

Refer to FIG. 3(c), which is a schematic diagram showing the user selecting five folders according to an embodiment of the present invention. In FIG. 3(c), the user selects the folder "1" and the folder "4" at one time, i.e., passing by from both sides of the folder "1" and the folder "4" at one time. If the user does not continue selecting, he may just join the thumb and index finger, i.e., detecting the touch point of the thumb and the touch point of the index finger moving to a same target point, forming two touch tracks with end-points intersected.

Refer to FIG. 3(d), which is a schematic diagram showing the user finishing the selection of the folders according to an embodiment of the present invention. In FIG. 3(d), the folders "1", "2", "4", "6", "9" are selected.

Figure 4:
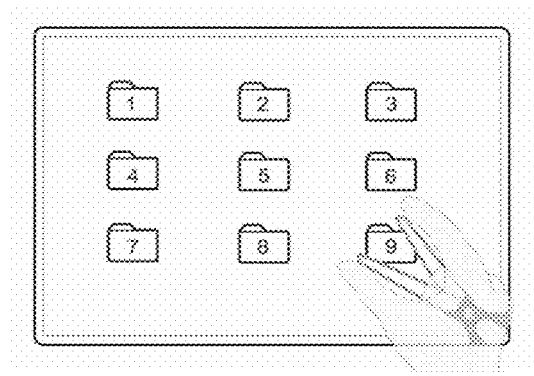
FIG. 4 is a schematic diagram of performing "Cut" operation to the selected folders according to an embodiment of the present invention.

The user may make a choice, before selecting the folders, as to perform on them whether "Copy" operation or "Cut" operation. If "Copy" operation is to be performed, then displayed on the touch screen will be a figure of "Sack", whereas a figure of "Scissors" may be displayed on the touch screen when "Copy" operation is to be performed. Refer to FIG. 4, which is a schematic diagram of performing "Cut" operation to the selected folders according to an embodiment of the present invention. The process of selection will be omitted as being similar to the above except for the difference of select and cut.

Step 203 and Step 204 are performed repeatedly, until the electronic device decides to end multi-select mode according to the user's gesture.

The method may further comprises: Step 205: The electronic device detecting only one touch point on the touch screen, or detecting two touch points not corresponding to any object on the touch screen, the electronic device deciding to end multi-select mode;

Step 206: The electronic device exiting multi-select mode.

Embodiment Three

In Embodiment Three, the user may click an object to be selected on the touch screen with a finger, and click another object to be selected on the touch screen with another finger, with the two fingers of the user being on the touch screen simultaneously, and multi-select mode is started at this time. In multi-select mode, the user may select objects on the touch screen by clicking with one finger or two fingers at the same time, all of the selected objects are set to the selected state. If the user wants to exit multi-select mode, he may click a region other than the objects on the touch screen with a finger or a stylus. It is to be noted that, at this time, whether the user clicks or encircles checked objects on the touch screen may not affect the exiting of multi-select mode, and the objects will be set from the selected state to the unselected state.

Figure 5:
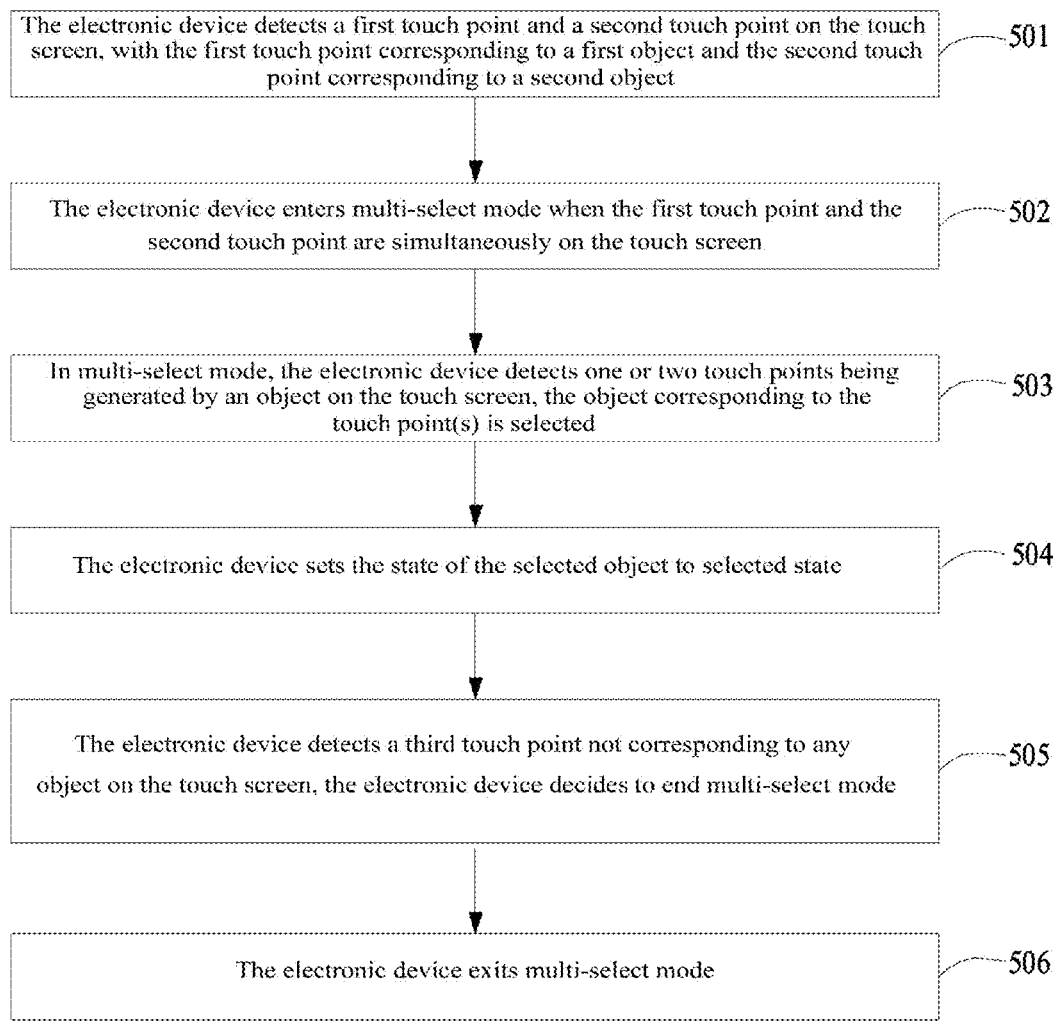
FIG. 5 is a flow chart of a method of gesture recognition according to Embodiment Three of the present invention.

Refer to FIG. 5, which is a flow chart of a method of gesture recognition according to Embodiment Three of the present invention, the method may comprise the steps as follows:

Step 501: The electronic device detecting a first touch point and a second touch point on the touch screen, with the first touch point corresponding to a first object and the second touch point corresponding to a second object;

Step 502: The electronic device entering multi-select mode when the first touch point and the second touch point are simultaneously on the touch screen;

It is to be noted that, the first object and the second object are set to the selected state, which may be accomplished by: adding the first object and the second object to a multi-select list for storing objects in the selected state.

The method may further comprises: Step 503: In multi-select mode, the electronic device detecting one or two touch points being generated by an object on the touch screen, the object corresponding to the touch point(s) is selected;

Step 504: The electronic device sets the state of the selected object to the selected state.

Herein, the processes of the electronic device detecting an object being selected and setting the state of the object to the selected state and the electronic device displaying the object selected by the user, and the selection operation performed by the user will be omitted as being identical to Embodiment Two of the present invention.

Step 503 and Step 504 are performed repeatedly, until the electronic device decides to end multi-select mode according to the user's gesture.

The method may further comprises: Step 505: The electronic device detecting a third touch point not corresponding to any object on the touch screen, the electronic device deciding to end multi-select mode;

Step 506: The electronic device exiting multi-select mode.

Embodiment Four

In Embodiment Four, the user may click an object on the touch screen with a finger, enclose and select at least one another object with another finger, that is, the object selected by a finger is located in a closed or approximately closed track on the screen generated by the other finger, moreover, the finger for clicking the object shall maintain on the touch screen until the enclosing and selecting is completed by the other finger, and multi-select mode is started at this time. In multi-select mode, the user may select objects on the touch screen by clicking with one finger or two fingers at the same time, all of the selected objects are set to the selected state. If the user wants to exit multi-select mode, he may click a region other than the objects on the touch screen with a finger or a stylus. It is to be noted that, at this time, whether the user clicks or encircles the selected object on the touch screen may not affect the exiting of multi-select mode, and the objects will be set from the selected state to the unselected state.

Figure 6:
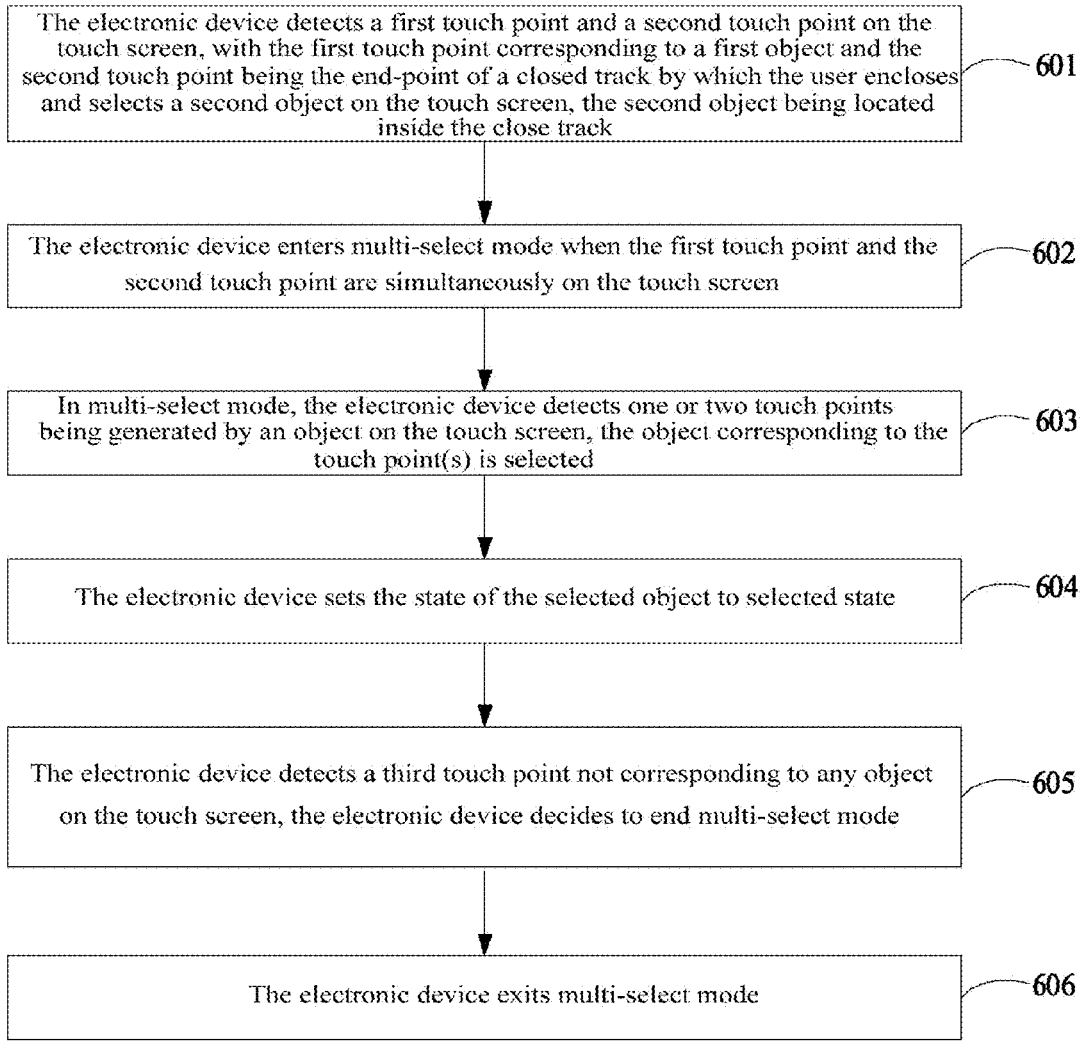
FIG. 6 is a flow chart of a method of gesture recognition according to Embodiment Four of the present invention.

Refer to FIG. 6, which is a flow chart of a method of gesture recognition according to Embodiment Four of the present invention, the method may comprise the steps as follows:

Step 601: The electronic device detecting a first touch point and a second touch point on the touch screen, with the first touch point corresponding to a first object and the second touch point being the end-point of a closed track by which the user encloses and selects a second object on the touch screen, the second object being located inside the closed track;

Step 602: The electronic device entering multi-select mode when the first touch point and the second touch point are simultaneously on the touch screen.

Likewise, the first object and the second object are set to the selected state, which may be accomplished by: adding the first object and the second object to a multi-select list for storing objects in the selected state.

The method may further comprises: Step 603: In multi-select mode, the electronic device detecting one or two touch points being generated by an object on the touch screen, the object corresponding to the touch point(s) is selected;

Step 604: The electronic device setting the state of the selected object to the selected state;

Herein, the process of the electronic device detecting an object being selected and setting the state of the object to the selected state and the electronic device displaying the selecting object selected by the user, and the selection operation performed by the user will be omitted as being identical to Embodiment Two of the present invention.

Step 603 and Step 604 are performed repeatedly, until the electronic device decides to end multi-select mode according to the user's gesture.

The method may further comprises: Step 605: The electronic device detecting a third touch point which is not corresponding to any object on the touch screen, the electronic device deciding to end multi-select mode;

Step 606: The electronic device exiting multi-select mode.

Embodiment Five

In Embodiment Five, the user may enclose and select at least one object on the touch screen with a finger, enclose and select at least one another object with another finger, moreover, there shall be a time in common when both fingers are on the touch screen after the enclosing and selecting finished, and multi-select mode is started at this time. In multi-select mode, the user may select objects on the touch screen by clicking with one finger or two fingers at the same time, all of the selected objects are set to the selected state. If the user wants to exit multi-select mode, he may click a region other than the objects on the touch screen with a finger or a stylus. It is to be noted that, at this time, whether the user clicks or encircles checked objects on the touch screen may not affect the exiting of multi-select mode, and the objects will be set from the selected state to the unselected state.

Figure 7:
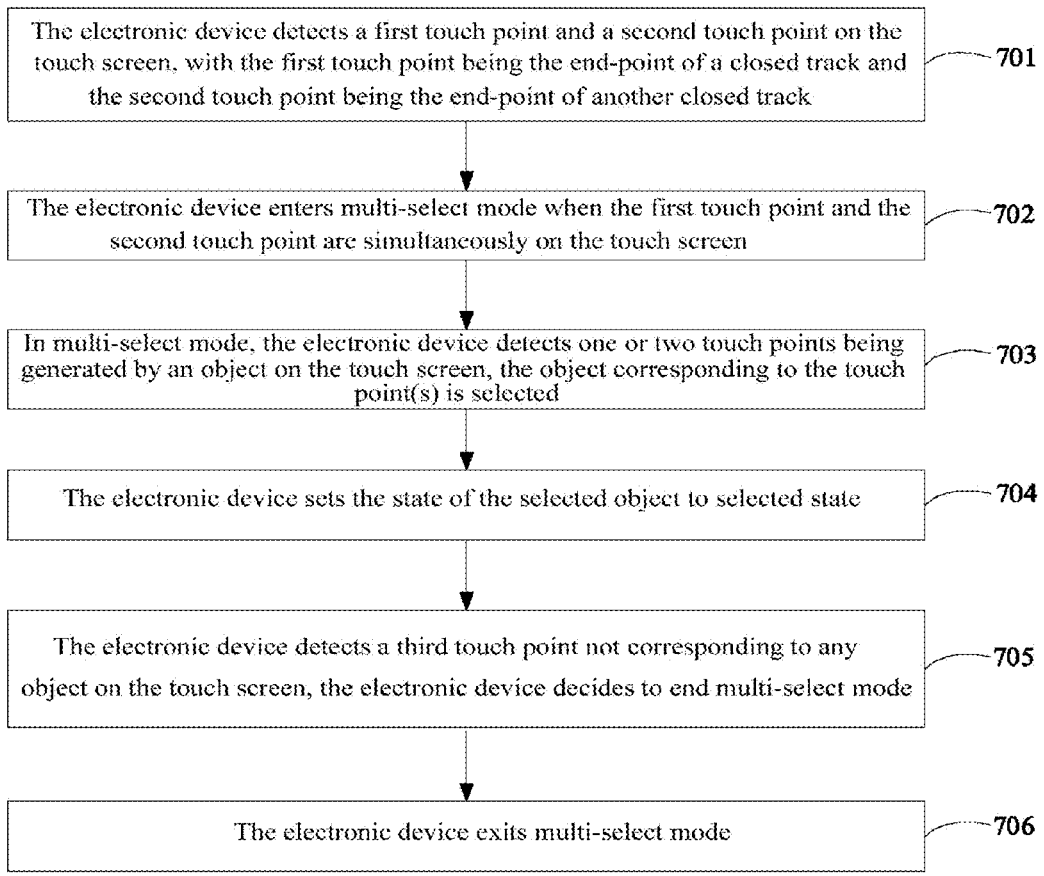
FIG. 7 is a flow chart of a method of gesture recognition according to Embodiment Five of the present invention.

Refer to FIG. 7, which is a flow chart of a method of gesture recognition according to Embodiment Five of the present invention, the method may comprise the step as follows:

Step 701: The electronic device detecting a first touch point and a second touch point on the touch screen, with the first touch point being the end-point of a closed track and the second touch point being the end-point of another closed track.

The two closed tracks are tracks by which the user encloses and selects objects on the screen, respectively, the selected objects are located inside the corresponding closed tracks, respectively.

The method may further comprise: Step 702: The electronic device entering multi-select mode when the first touch point and the second touch point are simultaneously on the touch screen.

Likewise, the first object and the second object are set to the selected state, which may be accomplished by: adding the first object and the second object to a multi-select list for storing objects in the selected state.

The method may further comprise: Step 703: In multi-select mode, the electronic device detecting one or two touch points being generated by an object on the touch screen, the object corresponding to the touch point(s) is selected;

Step 704: The electronic device setting the state of the selected object to the selected state.

Herein, the processes of descriptions on the electronic device detecting an object being selected and setting the state of the object to the selected state and the electronic device displaying the object selected by the user, and the selection operation performed by the user will be omitted as being identical to Embodiment Two of the present invention.

Step 703 and Step 704 are performed repeatedly, until the electronic device decides to end multi-select mode according to the user's gesture.

The method may further comprise: Step 705: The electronic device detecting a third touch point not corresponding to any object on the touch screen, the electronic device deciding to end multi-select mode;

Step 706: The electronic device exiting multi-select mode.

It can be seen that, in the embodiments of the present invention, multi-select mode may be entered when a first touch point and a second touch point simultaneously on the touch screen are detected, with the first touch point corresponding to at least one object and the second touch point corresponding to at least one object. In multi-select mode, even if the objects on the screen selected by the user are not adjacent, there is no need of cooperation with other keys for performing the operation, thereby simplifying the user operation, while the implementation is simple.

Figure 8:
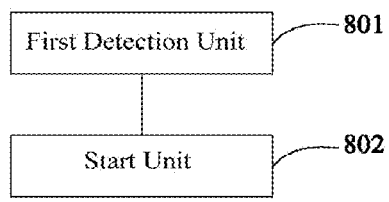
FIG. 8 is a structure diagram of an electronic device provided according to Embodiment Six of the present invention.

Refer to FIG. 8, which is a structure diagram of an electronic device provided according to Embodiment Six of the present invention. The electronic device displays at least one object on a touch screen thereof, wherein, the object has two states: a selected state and an unselected state, the electronic device may comprise:

a first detection unit 801, for detecting a first touch point and a second touch point on the touch screen;

a start unit 802, for entering multi-select mode when the first touch point and the second touch point are simultaneously on the touch screen, with the first touch point corresponding to at least one object and the second touch point corresponding to at least one object.

Herein, the at least one object corresponding to the first touch point and the at least one object corresponding to the second touch point may be identical, or may be not identical. In addition, the first detection unit 801 may detect two touch points triggered simultaneously; or may first detect a first touch point corresponding to an object, and then, while the first touch point not disappearing, detect another second touch point corresponding to an object in the process during which the first touch point is continuously detected.

Herein, the at least one object corresponding to the first touch point and the at least one object corresponding to the second touch point is set to the selected state.

It can be seen that, in the embodiments of the present invention, multi-select mode may be entered when a first touch point and a second touch point simultaneously on the touch screen are detected, with the first touch point corresponding to at least one object and the second touch point corresponding to at least one object, and the at least one object corresponding to the first touch point and the at least one object corresponding to the second touch point may be selected. In multi-select mode, even if the objects on the screen selected by the user are not adjacent, there is no need of cooperation with other keys for performing the operation, thereby simplifying the user operation, while the implementation is simple. Also, since multi-select mode is started by the object-selecting step itself, a step of entering multi-select mode by the user is omitted, thereby simplifying the user operation.

Figure 9:
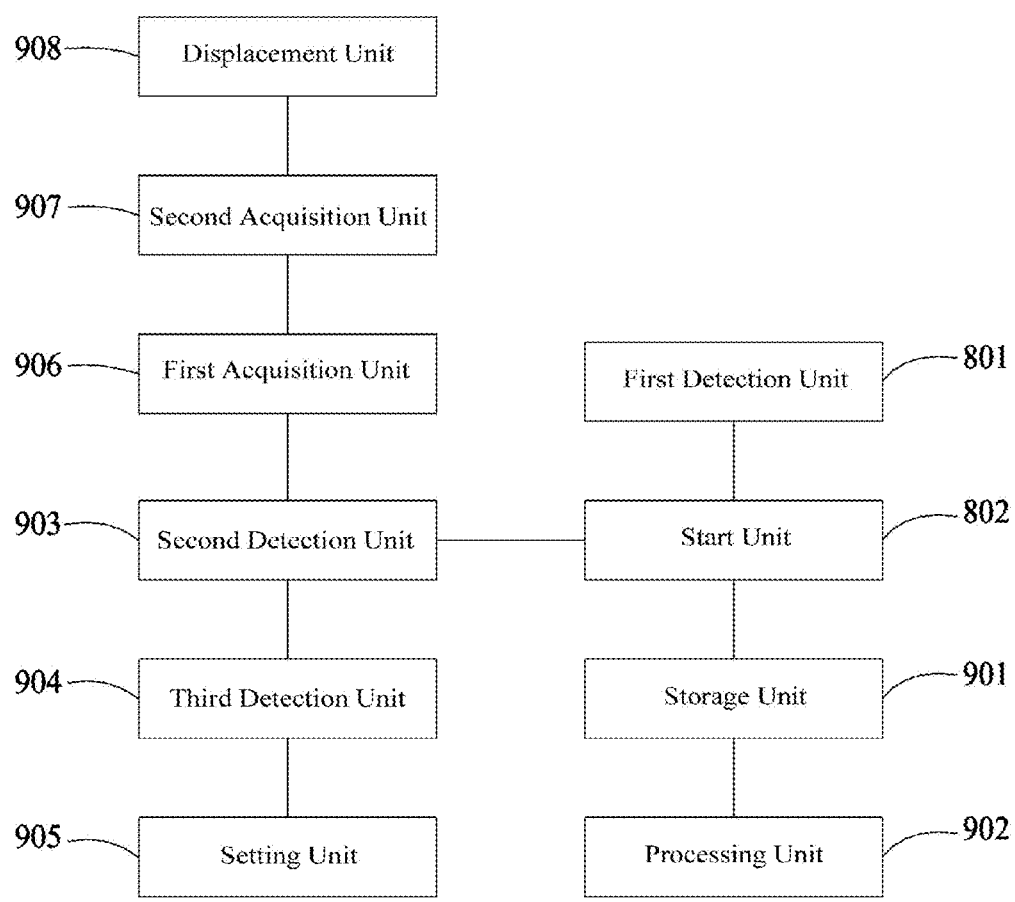
FIG. 9 is a structure diagram of an electronic device provided according to Embodiment Seven of the present invention.

Refer to FIG. 9, which is a structure diagram of an electronic device provided according to Embodiment Seven of the present invention. On the basis of FIG. 8, the electronic device may further comprise:

a storage unit 901, for storing a multi-select list for storing objects in the selected state;

a processing unit 902, for adding the checked objects to the multi-select list;

a second detection unit 903, for detecting a fourth touch point and a fifth touch point simultaneously on the touch screen, of course, the second detection unit 903 and the first detection unit 801 may be a same unit, or may be different units;

a third detection unit 904, for detecting a fourth track formed by the motion of the fourth touch point on the touch screen, and detecting a fifth track formed by the motion of the fifth touch point on the touch screen;

a setting unit 905, for setting the state of the third object to the selected state when the third object is located inside a region formed by the fourth track and the fifth track;

a first acquisition unit 906, for acquiring the initial position of the third object;

a second acquisition unit 907, for acquiring the target position of the third object according to the fourth track and the fifth track;

a displacement unit 908, for moving the third object from the initial position to the target position.

The electronic device may comprise: desktop computer with touch screen display, notebook or netbook with touch screen, tablet or other touch screen mobile terminals (mobile phone, Mobile Internet Device (MID), Ultra Mobile Personal Computer (UMPC), Smart Phone, and Personal Digital Assistant (PDA)).

The technical effects obtained by the embodiments of the present invention include: since multi-select mode is started by the object-selecting step itself, a step of entering multi-select mode by the user is omitted, thereby simplifying the user operation. In addition, since the display effect of the selection of the objects may be adjusted according to the selection gesture in multi-select mode, the user experience and intuitive effects are further improved.

Finally, it is to be noted that, in this description, relation terms such as first and second and the like are merely used to distinguish one entity or operation with another entity or operation, which may not necessarily require or imply the existence of any such substantial relation or order between these entities or operations. Also, terms "comprise", "include" or any other variations thereof are intended to encompass non-exclusive inclusion, so that a process, method, article, or device comprising a series of elements may include not only those elements, but also other elements not explicitly listed, or may further include elements inherent to this process, method, article, or device. Under the circumstance with no further limitation, the element defined by the phrase "comprise a . . . " does not exclude the existence of other same elements in the process, method, article, or device comprising said element.

Through the above description on implementations, those skilled in the art may clearly understand that, the present invention may be realized by software with necessary hardware platform, and, of course, may be implemented solely by hardware, while the former choice may be a better solution in many cases. Based on this, the entire of part of the contribution made by the technical solutions of the present invention to the related art may be embodied in the form of software product, which may be stored in storage media, such as ROM/RAM, magnetic disk, optical disk and the like, including instructions enabling a computer device (e.g., personal computer, server, or network device etc) to perform the methods described in the embodiments of the present invention or in certain part thereof.

The present invention has been described in detail as above, specific examples have been employed in the description to illustrate the principle and implementations of the present invention, the above description is provided for aid of comprehension for the method of the present invention and the essential idea thereof; meanwhile, for those ordinarily skilled in the art, according to the idea of the present invention, there may be change in both specific implementations and application range. Based on the above, the content of the description should not be construed as limitation on the present invention.

What is claimed is:

1. A method of gesture recognition for an electronic device displaying at least one object on a touch screen, wherein, the object has two states, a selected state and an unselected state, the method comprises:

detecting a first touch point and a second touch point on the touch screen;

entering multi-select mode when the first touch point and the second touch point are simultaneously on the touch screen, with the first touch point corresponding to at least one first object and the second touch point corresponding to at least one second object; wherein, the at least one first object corresponding to the first touch point and the at least one second object corresponding to the second touch point are set to the selected state; and,
during the multi-select mode, detecting a third touch point on a third object after the first touch point and the second touch point are not detected any more, wherein the third object corresponding to the third touch point is set to the selected state while the at least one first object and the at least one second object are still in the selected state;
or during the multi-select mode, detecting a fourth touch point on a fourth object and a fifth touch point on a fifth object simultaneously on the touch screen after the first touch point and the second touch point are not detected any more, wherein the fourth object corresponding to the fourth touch point and the fifth object corresponding to the fifth touch point are set to the selected state while the at least one first object and the at least one second object are still in the selected state;
or during the multi-select mode, detecting touch tracks of a sixth touch point and a seventh touch point simultaneously on the touch screen after the first touch point and the second touch point are not detected any more, wherein objects corresponding to a region defined by the touch tracks are set to the selected state while the at least one first object and the at least one second object are still in the selected state.

2. The method of claim 1, wherein, the at least one first object corresponding to the first touch point and the at least second object corresponding to the second touch point are set to the selected state as follows: adding the at least one first object corresponding to the first touch point and the at least second object corresponding to the second touch point to a multi-select list, and the multi-select list is configured for storing objects in the selected state.

3. The method of claim 1, wherein, the first touch point corresponding to at least one first object and the second touch point corresponding to at least one second object comprises:
the first touch point corresponds to a first object and the second touch point corresponds to a second object that is the same as the first object;
or,
the first touch point corresponds to a first object and the second touch point corresponds to a second object, wherein the first object is different from the second object;
or,
the first touch point corresponds to a first object, a second object is located inside a first region formed by a closed track with the second touch point as the end-point thereof;
or,
the first object is located inside a second region, and the second region is formed by a closed track with the first touch point as a end-point thereof, the second object is located inside a first region, the first region formed by a closed track with the second touch point as the end-point thereof.

4. The method of claim 3, wherein, if the first touch point corresponds to a first object and the second touch point corresponds to a second object that is the same as the first object, the method further comprises:
exiting multi-select mode when only one touch point is detected on the touch screen, or when two touch points not corresponding to any object are detected;
if the first touch point corresponds to a first object and the second touch point corresponds to a second object different from the first object, or if the first touch point corresponds to a first object and a second object is located inside a first region, or if a first object is located inside a second region and a second object is located inside a first region, the method further comprises:
exiting multi-select mode when a third touch point not corresponding to any object is detected on the touch screen.

5. The method of claim 1, wherein, after entering multi-select mode, the method further comprises after an eighth object is detected to be selected, setting the state of the eighth object to the selected state if the eighth object was in the unselected state before it was selected.

6. The method of claim 5, wherein, setting the state of the eighth object to the selected state after the eighth object is detected to be selected comprises:
detecting an eighth touch point and a ninth touch point simultaneously on the touch screen;
detecting a track formed by the motion of the eighth touch point on the touch screen, and detecting a track formed by the motion of the ninth touch point on the touch screen;
setting the state of the eighth object to the selected state when the eighth object is located inside a region formed by the track formed by the motion of the eighth touch point and the track formed by the motion of the ninth touch point.

7. The method of claim 6, wherein, the method further comprises:
acquiring the initial position of the eighth object;
acquiring the target position of the eighth object according to the track formed by the motion of the eighth touch point and the track formed by the motion of the ninth touch point;
moving the eighth object from the initial position to the target position.

8. An electronic device, displaying at least one object on a touch screen thereof, wherein, the object has two states: a selected state and an unselected state, the electronic device comprises:
a first detection unit, configured for detecting a first touch point and a second touch point on the touch screen;
a start unit, configured for entering multi-select mode when the first touch point and the second touch point are simultaneously on the touch screen, with the first touch point corresponding to at least one object and the second touch point corresponding to at least one object, wherein, the at least one object corresponding to the first touch point and the second touch point are set to the selected state;
a second detection unit, configured for detecting a fourth touch point and a fifth touch point simultaneously on the touch screen after the first touch point and the second touch point are not detected any further;
a third detection unit, configured for detecting a fourth track formed by the motion of the fourth touch point on the touch screen, and detecting a fifth track formed by the motion of the fifth touch point on the touch screen; and
a setting unit, configured for setting the state of the third object to the selected state when the third object is located inside a region formed by a fourth track and a fifth track while the at least one object corresponding to the first touch point and the second touch point are still in the selected state.

9. The electronic device of claim 8, wherein, the electronic device further comprises:
a storage unit, configured for storing a multi-select list for storing objects in the selected state;

a processing unit, configured for adding the checked objects to the multi-select list.

10. The electronic device of claim 8, wherein, the electronic device further comprises:
a first acquisition unit, configured for acquiring the initial position of the third object;
a second acquisition unit, configured for acquiring the target position of the third object according to the fourth track and the fifth track;
a displacement unit, configured for moving the third object from a initial position to the target position.

* * * * *